US012006944B2

(12) United States Patent
Botkin et al.

(10) Patent No.: US 12,006,944 B2
(45) Date of Patent: *Jun. 11, 2024

(54) CEILING FAN SEALING ASSEMBLY

(71) Applicant: Hunter Fan Company, Memphis, TN (US)

(72) Inventors: Charles William Botkin, Cordova, TN (US); Bobby Neal Norwood, Oakland, TN (US); Matthew McPherson, Memphis, TN (US); Douglas Troy Mason, Horn Lake, MS (US)

(73) Assignee: Hunter Fan Company, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/308,242

(22) Filed: Apr. 27, 2023

(65) Prior Publication Data

US 2023/0265856 A1 Aug. 24, 2023

Related U.S. Application Data

(63) Continuation of application No. 17/811,719, filed on Jul. 11, 2022, now Pat. No. 11,674,522, which is a (Continued)

(51) Int. Cl.

| | |
|---|---|
| ***F04D 25/08*** | (2006.01) |
| ***F04D 29/08*** | (2006.01) |
| ***F04D 29/32*** | (2006.01) |
| ***F04D 29/52*** | (2006.01) |
| ***F04D 29/60*** | (2006.01) |
| ***F04D 29/64*** | (2006.01) |
| ***F21S 8/06*** | (2006.01) |
| *F21V 33/00* | (2006.01) |

(52) U.S. Cl.

CPC ......... *F04D 25/088* (2013.01); *F04D 29/083* (2013.01); *F04D 29/329* (2013.01); *F04D 29/522* (2013.01); *F04D 29/601* (2013.01); *F04D 29/646* (2013.01); *F21S 8/063* (2013.01); *F21V 33/0096* (2013.01)

(58) Field of Classification Search

None

See application file for complete search history.

(56) References Cited

U.S. PATENT DOCUMENTS

| | | | |
|---|---|---|---|
| 4,592,702 | A | 6/1986 | Bogage |
| 5,097,398 | A | 3/1992 | Dye |

(Continued)

FOREIGN PATENT DOCUMENTS

| | | | |
|---|---|---|---|
| CN | 203384122 | U | 1/2014 |
| CN | 106068386 | A | 11/2016 |

(Continued)

*Primary Examiner* — Juan G Flores

(74) *Attorney, Agent, or Firm* — McGarry Bair PC

(57) ABSTRACT

A ceiling fan assembly or similar air-moving device can include a motor for rotating one or more blades to drive a volume of air about a space. The ceiling fan assembly can include a motor assembly and a light kit. The light kit can include a light frame and a light glass holder. The light frame can selectively couple to the light glass holder by a threaded connection. The light kit, motor assembly, or between the light kit and motor assembly can further include one or more sealing or deflecting components.

30 Claims, 7 Drawing Sheets

Related U.S. Application Data continuation of application No. 16/798,897, filed on Feb. 24, 2020, now Pat. No. 11,421,698.

(56) References Cited

U.S. PATENT DOCUMENTS

| | | | | |
|---|---|---|---|---|
| 5,135,365 | A | 8/1992 | Bogage | |
| 6,491,407 | B1 | 12/2002 | Beadle | |
| 6,923,560 | B2 * | 8/2005 | Huang | B60Q 1/2611 362/267 |
| 7,180,214 | B1 | 2/2007 | Hettinger | |
| 7,367,688 | B1 * | 5/2008 | Bucher | C12N 15/86 362/267 |
| 9,334,872 | B2 | 5/2016 | Wark | |
| 9,585,981 | B2 | 3/2017 | Wynalda, Jr. | |
| 9,664,194 | B2 | 5/2017 | Oleson | |
| 11,421,698 | B2 * | 8/2022 | Botkin | F04D 29/522 |
| 11,674,522 | B2 * | 6/2023 | Botkin | F21S 8/063 415/208.1 |
| 2015/0009666 | A1 | 1/2015 | Keng et al. | |

FOREIGN PATENT DOCUMENTS

| | | | |
|---|---|---|---|
| CN | 205841249 | U | 12/2016 |
| CN | 206478029 | U | 9/2017 |
| CN | 110030197 | A | 7/2019 |
| EP | 2443345 | B1 | 12/2015 |
| JP | 2016140227 | A | 8/2016 |
| SG | 193219 | A1 | 9/2013 |

* cited by examiner

CEILING FAN SEALING ASSEMBLY

CROSS-REFERENCE TO RELATED APPLICATION

This application is a continuation application of U.S. patent application Ser. No. 17/811,719, filed Jul. 11, 2022, now allowed, which is a continuation of U.S. patent application Ser. No. 16/798,897, filed Feb. 24, 2020, now U.S. Pat. No. 11,421,698, which are hereby incorporated herein by reference in their entirety.

BACKGROUND

Ceiling fans are machines typically suspended from a structure for moving a volume of air about an area. While the structure to which the ceiling fan is mounted is typically a ceiling or part of a ceiling, such as a joist or beam, the structure can be a wall or any other structure for that matter.

The ceiling fan includes a motor, suspended from and electrically coupled to the structure. A set of blades mount to the motor such that the blades are rotatably driven by the motor and can be provided at an angled orientation to move a volume of air about the area.

Ceiling fans, are often used in environments that can subject sensitive components to moisture. For example, a ceiling fan can be mounted outside or in other damp/wet environments. These ceiling fans can encounter natural moisture such as humidity and rain. Ceiling fans, being in such an environment, can also encounter moisture when cleaned by users. Cleaning can include hand washing or power washing. While efforts have been made to protect sensitive components, challenges arise, as ceiling fans include several moving components that can be challenging to seal.

BRIEF DESCRIPTION

In one aspect, this description relates to a ceiling fan comprising: a motor assembly suspended from a structure and defining an axis of rotation; a set of blades rotatably driven by the motor assembly; a motor housing encasing the motor assembly; a light kit; at least one of the housing and the light kit has a first portion and a second portion, with both the first portion and second portion extending in a direction of the axis of rotation, and both the first portion and side portion have overlapping side faces; and a gasket provided between the overlapping side faces.

DETAILED DESCRIPTION

Figure 1:
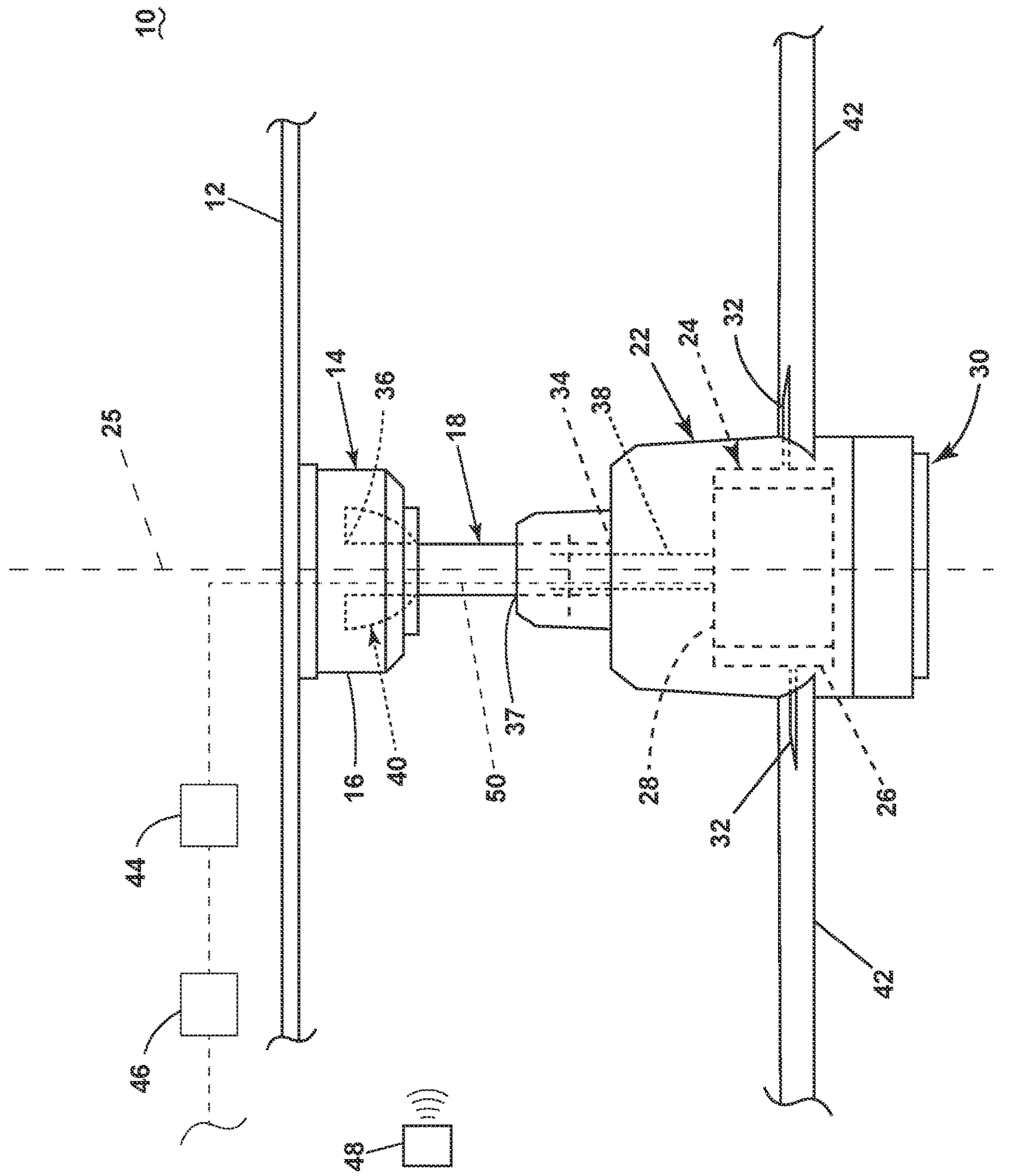
FIG. 1 is a schematic view of a structure with a ceiling fan assembly suspended from the structure.

The disclosure is related to a ceiling fan and ceiling fan blade, which can be used, for example, in residential and commercial applications. Such applications can be indoors, outdoors, or both. While this description is primarily directed toward a residential ceiling fan, it is also applicable to any environment utilizing fans or for cooling areas utilizing air movement. Additionally, the disclosure can be related to a ceiling fan or air mover assembly, as used in damp or wet environments, as the ceiling fan provides for sealed electrical operation in a damp or wet environment.

As used herein, the term “set” or a “set” of elements can be any number of elements, including only one. All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring now to FIG. 1, a ceiling fan 10 is suspended from a structure 12. In non-limiting examples, the ceiling fan 10 can include one or more ceiling fan components including a ceiling fan mount 14 with a downrod 18, a canopy 16, a housing or motor housing 22 at least partially encasing a motor assembly 24 having a rotor 26 and a stator 28, a light kit 30, a set of blade irons 32, and a set of blades 42. In additional non-limiting examples, the ceiling fan 10 can include one or more of a controller, a wireless receiver, a light glass, a light cage, a spindle, a finial, a switch housing, blade forks, blade tips or blade caps, or other ceiling fan components.

The motor assembly 24, when mounted to a structure 12, can define an axis of rotation 25. Optionally, the axis of rotation 25 can be a centreline for the downrod 18. The downrod 18 can have a first end 34 and a second end 36. The downrod 18 can pass through an opening 37 in the motor housing 22. By way of non-limiting example, the first end 34 of the downrod 18 that passes through the opening 37 can be coupled to one or more support structures, shown as a motor shaft 38. The motor shaft 38 can couple the motor assembly 24 to the first end 34 of the downrod 18 so that the downrod 18 suspends the motor assembly 24 from the structure 12. It is contemplated, however, that the first end 34 of the downrod 18 can be configured to couple to the motor assembly 24 in any other manner, or to any other suitable component of a ceiling fan.

The second end 36 of the downrod 18 is illustrated, by way of non-limiting example, as being coupled to a ball mount 40. It is contemplated, however, that the second end 36 of the downrod 18 can be mounted to the structure 12, directly or intermediately, using other suitable structures or means, and should not be limited as shown herein.

At least one fan blade 42 can be carried by the rotor 26, so that the at least one fan blade 42 can be rotatably driven by the motor assembly 24. For example, the at least one fan blade 42 can extend radially from the ceiling fan 10, and can be rotatable to drive a volume of fluid such as air. That is, the at least one fan blade 42 can be operably coupled to the motor assembly 24 at the rotor 26, such as via the blade irons 32. The at least one fan blade 42 can include a set of blades 42, having any number of blades, including only one blade.

The structure 12 can be a ceiling, for example, from which the ceiling fan 10 is suspended. It should be understood that the structure 12 is schematically shown and is by way of example only, and can include any suitable building, structure, home, business, or other environment wherein moving air with a ceiling fan is suitable or desirable. The structure 12 can also include an electrical supply 44 and can electrically couple to the ceiling fan 10 to provide electrical power to the ceiling fan 10 and the motor assembly 24 therein. It is also contemplated that the electrical supply be sourced from somewhere other than the structure 12, such as a battery or generator in non-limiting examples.

A wired controller 46 can be electrically coupled to the electrical supply 44 to control operation of the ceiling fan 10 via the electrical supply 44. Alternatively, the wired controller 46 can be wirelessly or communicatively coupled to the ceiling fan 10, configured to control operation of the ceiling fan 10 remotely, without a dedicated connection, such as with a remote control, or smartphone and related software application. Non-limiting examples of controls for the ceiling fan 10 can include fan speed, fan direction, or light operation. Furthermore, a separate wireless controller 48, alone or in addition to the wired controller 46, can be communicatively coupled to a controller or a wireless receiver in the ceiling fan 10 to control operation of the ceiling fan 10. It is further contemplated in one alternative example that the ceiling fan be operated by the wireless controller 48 alone, and is not operably coupled with the wired controller 46.

At least one wire 50 provides electrical power or information to the motor assembly 24 from the electrical supply 44 or the wired controller 46. The at least one wire 50 can extend through at the canopy 16, the downrod 18, and the motor housing 22 before reaching the motor assembly 24 or the light kit 30.

Figure 2:
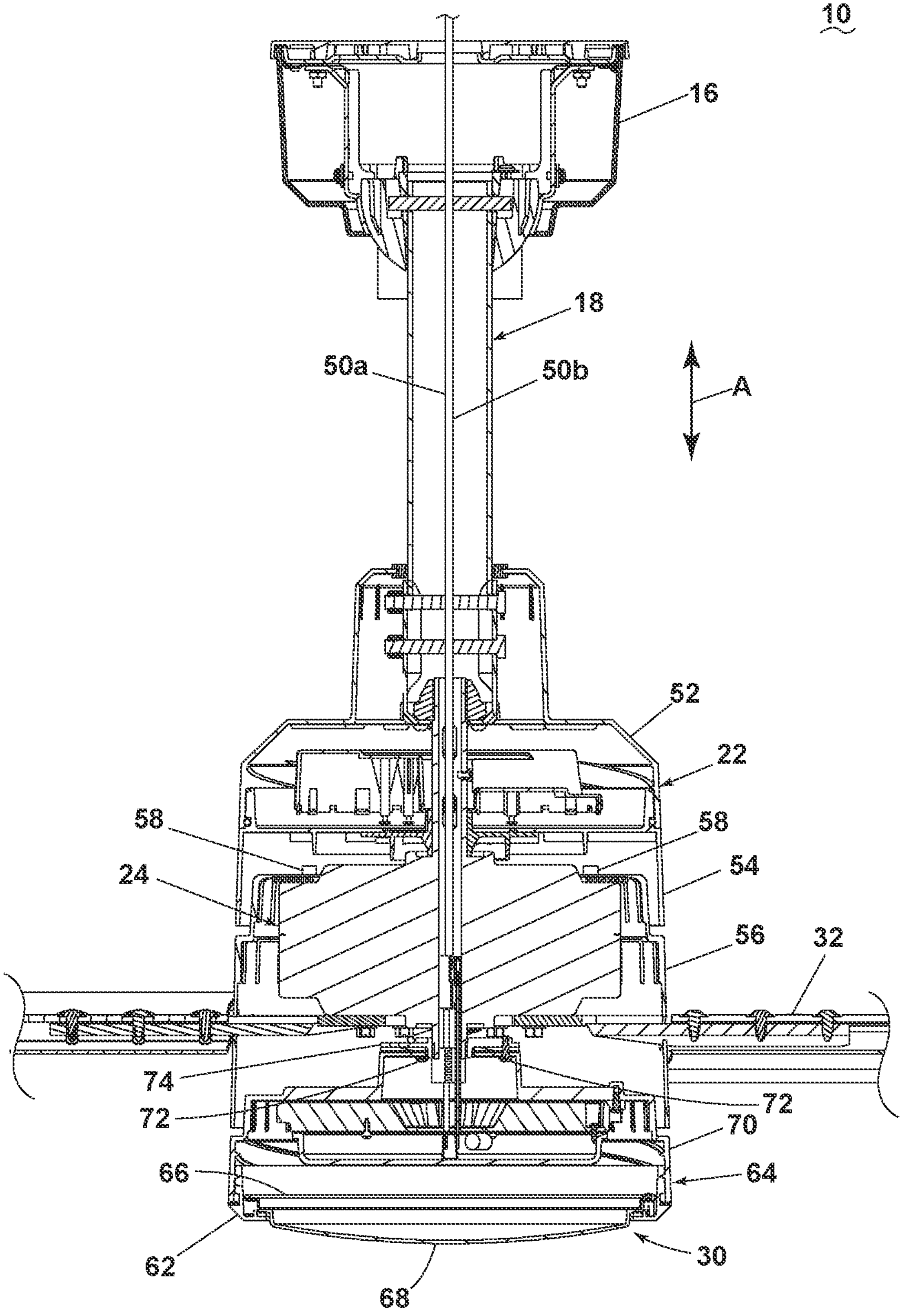
FIG. 2 is a cross-sectional view of a portion of the ceiling fan assembly of FIG. 1.

FIG. 2 illustrates, by way of non-limiting example, a cross section of the ceiling fan 10, including a first wire 50*a* and a second wire 50*b* that extend through the canopy 16, the downrod 18, and the motor housing 22 before reaching the motor assembly 24. At least one of the first wire 50*a* or the second wire 50*b* also electrically couple to the light kit 30.

The motor housing 22 can include an upper control housing 52, a lower control housing 54, and a rotatable housing portion 56. The upper control housing 52 can surround the downrod 18 as it enters the motor housing 22. The upper control housing 52 of the motor housing 22 can be selectively coupled to the lower control housing 54 by a threaded connection.

The rotatable housing portion 56 can be fastened to the motor assembly 24 via fasteners 58. By way of non-limiting example, while considered part of the motor housing 22, the rotatable housing portion 56 does not directly couple to the upper or lower control housings 52, 54, as the rotatable housing portion 56 rotates, but the upper and lower control housings 52, 54 do not. However, it is contemplated that the rotatable housing portion 56 can axially overlap one or more portions of the lower control housing 54, where an axial direction A can be defined as the direction of the downrod 18 as illustrated by arrow A, or can be defined parallel to the axis of rotation 25 of FIG. 1. The set of blade irons 32 can extend through the rotatable housing portion 56 and couple to the rotor 26 of the motor assembly 24, so that the set of blades 42 and the rotatable housing portion 56 rotate together. Alternatively, it is contemplated that the blade irons 32 couple to and are rotatably driven by the rotatable housing portion 56.

The rotatable housing portion 56 can axially overlap at least a portion of the light kit 30. The light kit 30 can include a housing or light housing 64, a light glass retainer 66, and a light glass 68. The light housing 64 can have a first portion and second portion, illustrated by way of example as a light frame 70 and a light glass holder 62. The light frame 70 can be selectively coupled to the light glass holder 62 by a threaded connection to define the light housing 64.

By way of non-limiting example, a light kit adapter 74 is coupled to the motor shaft 38. The light kit fasteners 72 can couple the light frame 70 to the light kit adapter 74, coupling the light kit 30 to the ceiling fan 10. The light glass 68 can be secured or otherwise coupled to the light glass holder 62 via the light glass retainer 66. More specific details of the light kit 30 are further discussed in FIG. 4.

Figure 3:
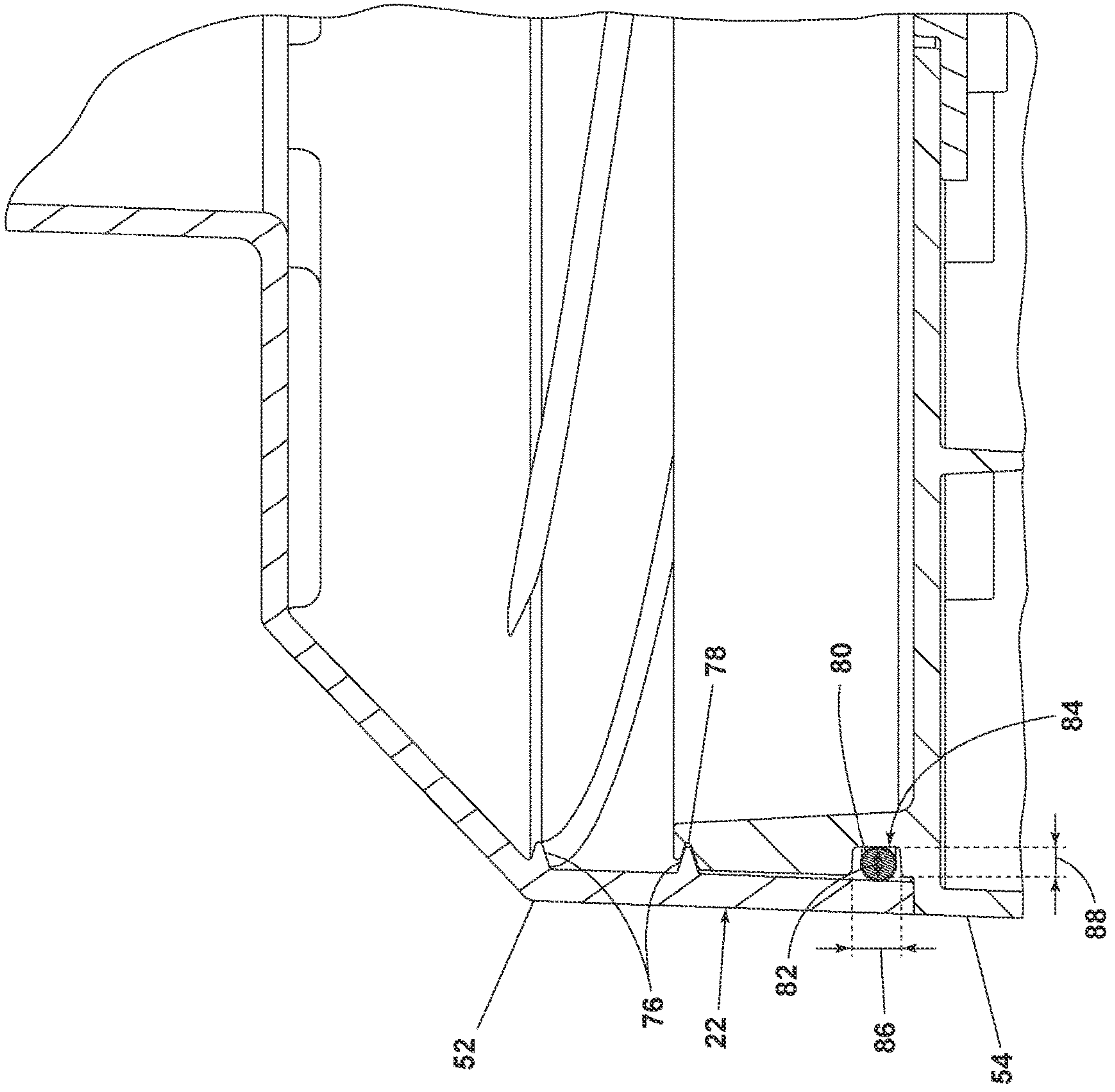
FIG. 3 is an enlarged cross-sectional view of a portion of a motor housing of the ceiling fan assembly of FIG. 2.

Referring to FIG. 3 the upper control housing 52 can form a first portion, and the lower control housing 54 can be a second portion. The upper and lower control housings 52, 54 can be connected by a threaded connection, for example, between upper threads 76 of the upper control housing 52 and the lower threads 78 of the lower control housing 54. Thus, the upper control housing 52 selectively couples to the lower control housing 54 by the threaded connection of the upper and lower threads 76, 78. The upper threads 76 can include a first set of control threads and a central opening that threads to a second set of control threads defined at least in part by the lower threads 78 complementary to the first set of control threads.

A gasket 80 is provided between the upper control housing 52 and the lower control housing 54, sealing the motor housing 22 between the upper control housing 52 and the lower control housing 54. By way of non-limiting example, the gasket 80 can be an O-ring having a diameter 82.

As illustrated by way of non-limiting example, a channel 84, can be formed in the lower control housing 54 of the motor housing 22. It is also contemplated that the channel 84 can be formed in the upper control housing 52, or in any suitable manner to carry the gasket 80 between the upper and lower control housings 52, 54. It is further contemplated that the channel 84 can be formed or defined by corresponding channels or grooves among both the upper control housing 52 and the lower control housing 54. The channel 84 can have a height 86 and a depth 88 such that the diameter 82 of the O-ring can be greater than the depth 88 of the channel 84. The dimensional differences the diameter 82 of the gasket 80 and the depth 88 of the channel 84 allow compression of the gasket 80 when the upper control housing 52 threads to the lower control housing 54, to seal the motor housing 22 between the upper control housing 52 and the lower control housing 54.

Figure 4:
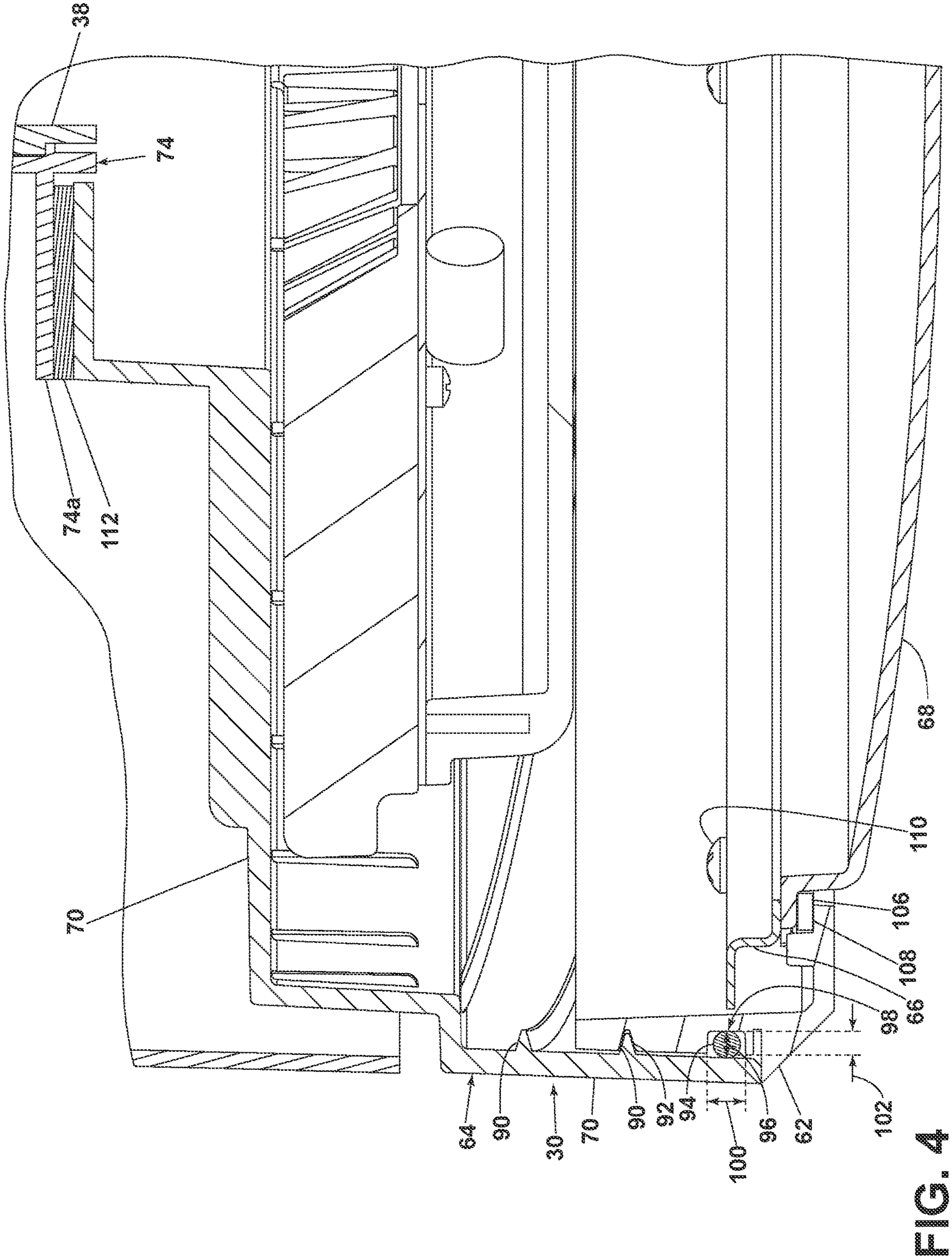
FIG. 4 is another enlarged cross-sectional view of a portion of the motor housing and a portion of a light kit of the ceiling fan assembly of FIG. 2.

Referring to FIG. 4, the light housing 64 can have a first portion and second portion, illustrated by way of example as a light frame 70 and a light glass holder 62. The light frame 70 can be selectively coupled to the light glass holder 62 by a threaded connection to define the light housing 64. The threaded connection can be, for example, among a set of upper light kit threads 90 of the light frame 70 and a set of lower light kit threads 92 of the light glass holder 62. Thus, the light frame 70 selectively, threadably couples to the light glass holder 62 by the threaded connection of the upper and lower light kit threads 90, 92.

Optionally, a light kit gasket 94 is provided between the light frame 70 and the light glass holder 62, sealing the light housing 64 between the light frame 70 and the light glass holder 62. By way of non-limiting example, the light kit gasket 94 can be an O-ring having a diameter 96.

A holder channel or channel 98 can be formed in the light glass holder 62 of the motor housing 22, while it is also contemplated that the channel 98 can be formed in the light frame 70. It is further contemplated that the channel 98 can be formed of corresponding channels or grooves among both the light frame 70 and the light glass holder 62. The channel 98 can have a height 100 and a depth 102. The diameter 96 of the light kit gasket 94 is larger than the depth 102 of the channel 98, providing for compressively sealing the light kit assembly at the connection between the light frame 70 and the light glass holder 62 at the light kit gasket 94. The dimensional differences the diameter 96 of the light kit gasket 94 and the depth 102 of the channel 98 allow the light kit gasket 94 to seal the light housing 64 between the light frame 70 and the light glass holder 62.

A second gasket 106 can be provided between the light glass 68 and the light glass holder 62. A lip 108 can be included in the light glass holder 62 to position or retain the second gasket 106. That is, the second gasket 106 can be provided in the lip 108. The light glass retainer 66 can be fastened to the light glass holder 62 via a light fastener 110, so that the light glass 68 can be secured to the light glass holder 62 via the light glass retainer 66. During fastening of the light glass retainer 66 to the light glass holder 62, the second gasket 106 can be compressed between the light glass 68 and the light glass holder 62, compressed by the light glass retainer via the light fastener 110.

A motor adapter gasket 112 can be positioned between the light kit adapter 74 and the light housing 64. The light kit adapter 74 can include a projections 74*a*, radially extending from the light kit adapter 74, relative to the axis of rotation 25. The motor adapter gasket 112 can be contained within the motor housing 22, hidden from view of the installer or user. That is, the motor adapter gasket 112 can be located between the light kit adapter 74 and the light frame 70 of the light housing 64. The light kit adapter 74 can retain the motor adapter gasket 112 at an annular flange, for example.

Figure 5:
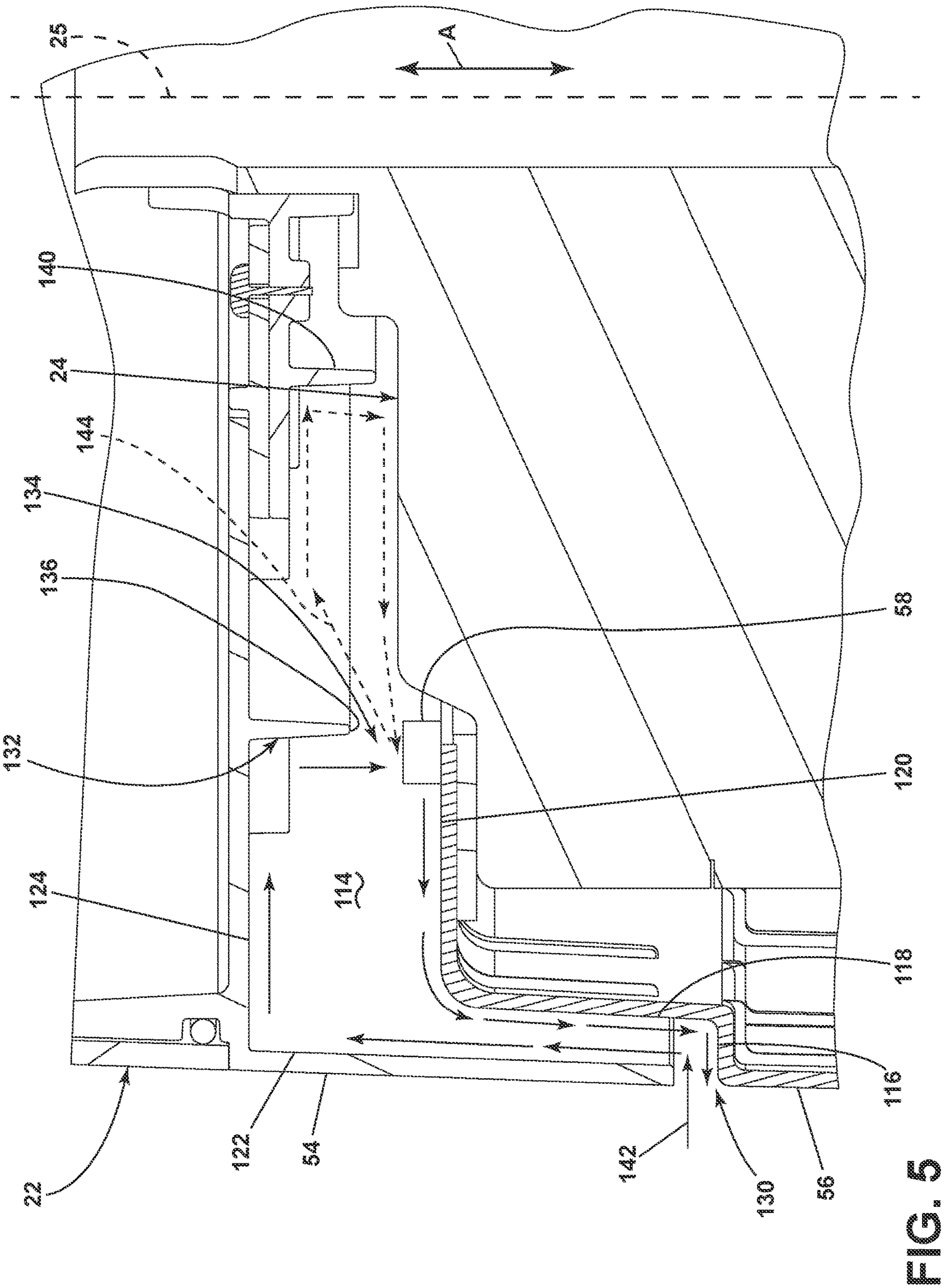
FIG. 5 is yet another enlarged cross-sectional view of a rotating portion of the motor housing from the ceiling fan assembly of FIG. 2.

FIG. 5 illustrates an enlarged portion of the motor housing 22, further illustrating the axial overlap of the lower control housing 54 partially surrounding the rotatable housing portion 56. The rotatable housing portion 56 is adjacent to and spaced from the lower control housing 54 to define a gap 114. The gap 114 can be defined, at least in part, by first, second, and third internal wall surfaces 116, 118, 120 of the rotatable housing portion 56, the motor assembly 24, and a first and a second interior wall 122, 124 of the lower control housing 54. That is, the gap 114 is the region or space inside the motor housing 22 between the rotatable housing portion 56 and the lower control housing 54. The gap 114 can have an inlet 130 illustrated, by way of non-limiting example as the gap 114 formed at the space between the first internal wall 116 of the rotatable housing portion 56 and the first interior wall 122 of the lower control housing 54. The inlet 130, can be annular, and can also be an outlet depending on the direction of movement of a fluid or other item into or out of the gap 114. It is contemplated that the first inlet can be the portion of the gap 114 has the greatest radial distance from the axis of rotation 25.

The lower control housing 54 can include a first water deflection rib 132 that extends into the gap 114. The first water deflection rib 132 can extend toward the rotatable housing portion 56, shown as extending in the axial direction A from the second interior wall 124 of the lower control housing 54, and extending toward, but spaced from the rotatable housing portion 56 or motor assembly 24.

A portion 134 of the gap 114 can be, at least in part, defined a tip 136 of the first water deflection rib 132 and one of the rotatable housing portion 56, fasteners 58, or the motor assembly 24 confronting the tip 136. That is, the gap 114 can be thinned by the first rib 132 at the portion 134.

A second water deflection rib 140 can extend from the lower control housing 54 that is positioned radially inward of the first water deflection rib 132, relative to the axis of rotation 25. As illustrated, by way of non-limiting example, the second water deflection rib 140 generally extends in the axial direction A from the second interior wall 124 of the lower control housing 54, but spaced from at least one of the rotatable housing portion 56 or motor assembly 24, similar to that of the first water deflection rib 132.

In operation, a primary water flow 142 can enter the gap 114 at the inlet 130. The primary water flow 142 can splash against or be directed by at least one of the first, second, or third internal walls 116, 118, 120, the first or second internal walls 122, 124, or the first water deflection rib 132. At least a portion of the primary water flow 142, after splashing or otherwise being deflected, exits the gap 114 through the inlet 130 that can also serve as an outlet for the primary water flow 142.

A secondary water flow 144 can be defined by a portion of the primary water flow 142 that extends into the gap 114 in a radially inward direction, past the first water deflection rib 132. The secondary water flow 144 can splash against or be directed by at least one of the second interior wall 124, the second water deflection rib 140, or the motor assembly 24. After splashing or otherwise being deflected, the secondary water flow 144 re-joins the primary water flow 142 via the portion 134.

At least one of the first, second, and third internal walls 116, 118, 120, the first and second internal walls 122, 124, or the first and second water deflection ribs 132, 140 can keep water from entering other internal regions of the ceiling fan 10. It is contemplated that one or more gaps similar to the gap 114 can be located between any two components or housing portions of the ceiling fan 10.

Figure 6:
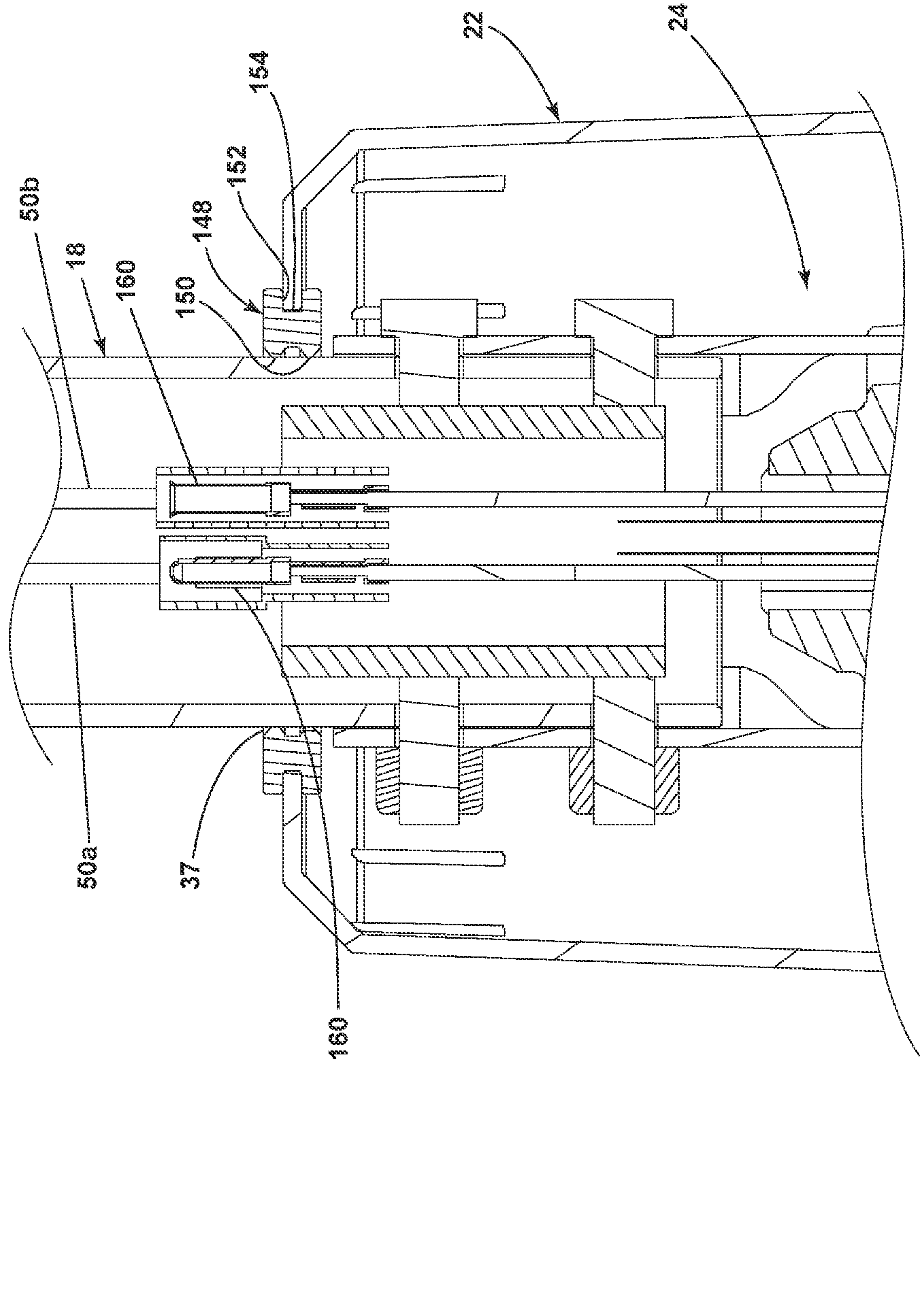
FIG. 6 is an enlarged cross-sectional view of a portion of the motor housing, a motor shaft, and a downrod of the ceiling fan assembly of FIG. 2.

FIG. 6 further illustrates the interface between the downrod 18 and the upper control housing 52 of the motor housing 22. A downrod gasket 148 can be provided between the downrod 18 and the motor housing 22 at the opening 37. The downrod gasket 148 can include a wedge shape 150, or multiple wedge shapes 150, that can abut the downrod 18. Additionally, or alternatively, the downrod gasket 148 can include a gasket channel 152 that can receive an edge 154 of the motor housing 22 along the opening 37.

Seals 160 can be used within the ceiling fan 10 to protect electrical or data connections. By way of non-limiting example, the seals 160 are illustrated at the transition of the first and second wires 50*a*, 50*b* from the downrod 18 to the one or more components of the motor assembly 24. However, any suitable position of wiring or a seal therefore is contemplated. Ideally, the seal 160 is any electrical connector that can form a watertight seal, while making the related electrical connections.

Figure 7:
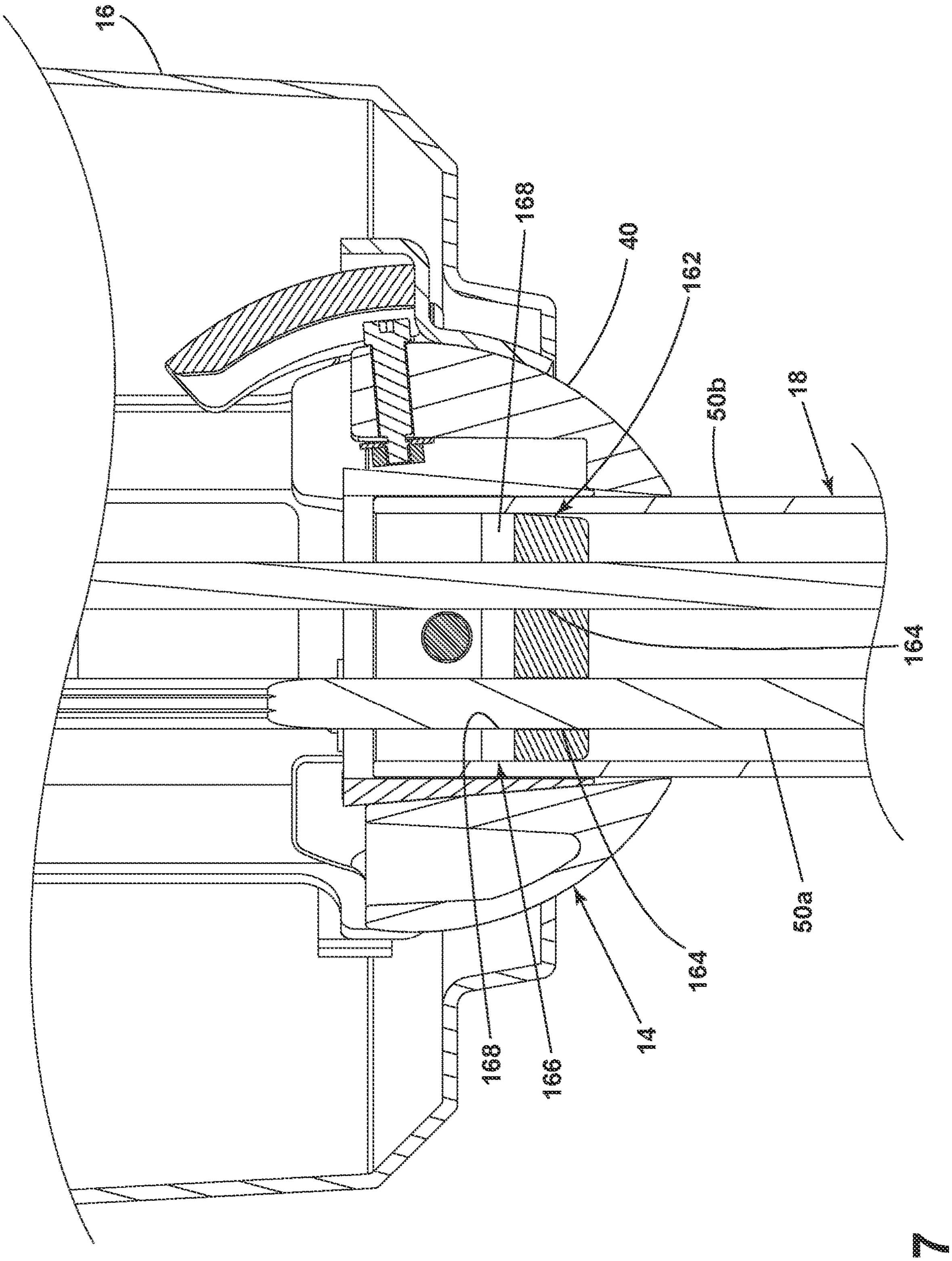
FIG. 7 is an enlarged cross-sectional view of a portion of the downrod having an interior seal of the ceiling fan assembly of FIG. 2.

FIG. 7 further illustrates the interface between the downrod 18 and the ceiling fan mount 14 or ball mount 40. A gasket plug 162 can be provided in the downrod 18. The gasket plug 162 includes at least one plug opening 164 for passing a wire through the gasket plug 162. The wire can be, by way of example, the first and second wires 50*a*, 50*b* as described herein. A sealant 166 can be provided on or abut the gasket plug 162 within the downrod 18. The sealant 166 can include at least one sealant opening 168 for passing, for example, the first and second wires 50*a*, 50*b* through the sealant 166. However, it should be understood that such an opening 168 can merely be formed as a result of applying the sealant 166 to the gasket plug 162 and around the first and second wires 50*a*, 50*b*, and need not be a tradition opening like a hole formed in a component. It is contemplated that the sealant 166 can be adjacent to or formed with the gasket plug 162. Alternatively, a gap, void, or other material can be located between the sealant 166 and the gasket plug 162. While illustrated as aligned, it is contemplated that the at least one plug opening 164 and the at least one sealant opening 168 do not have to be aligned in the axial or radial directions.

Benefits of aspects of the present disclosure include a water-resistant interface for two or more components of the motor housing or the light housing. The interface or selective coupling can include a threaded connection and gasket.

Further, the motor adapter gasket located between a portion of the motor housing can further restrict water from reaching selected portions of the ceiling fan.

Another benefit of the disclosure includes water deflectors and directors for one or more gaps between components. The intentional shape of the gap with at least on water deflection rib can encourage water that enters the ceiling fan to exit the ceiling fan through desired inlet/outlet locations.

Additional water deflection devices can include a downrod gasket, a gasket plug, and seals. The downrod gasket can direct water away from the opening in which the downrod passes into the motor housing. The gasket plug can be a plug, seal, or combination therein, housed within the downrod to restrict the movement of water through the downrod. The seals can protect the intersection of wires within the ceiling fan.

Aspects of the disclosure can be used in part or in combination to enable the ceiling fan to pass water spray testing, such as, but not limited to, Underwriters Laboratories (UL) hose down and splash testing or Ingress Protection (IP) testing.

To the extent not already described, the different features and structures of the various features can be used in combination as desired. That one feature is not illustrated in all of the aspects of the disclosure is not meant to be construed that it cannot be, but is done for brevity of description. Thus, the various features of the different aspects described herein can be mixed and matched as desired to form new features or aspects thereof, whether or not the new aspects or features are expressly described. All combinations or permutations of features described herein are covered by this disclosure.

This written description uses examples to detail the aspects described herein, including the best mode, and to enable any person skilled in the art to practice the aspects described herein, including making and using any devices or systems and performing any incorporated methods. The patentable scope of the aspects described herein are defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A ceiling fan comprising a motor assembly suspended from a structure and defining an axis of rotation, a set of blades rotatably driven by the motor assembly, a housing including a first portion and a second portion, whereby the first portion selectively couples to the second portion by a threaded connection, and a gasket provided between the first portion and the second portion, sealing the housing between the first portion and the second portion.

A waterproof system for a ceiling fan, the waterproof system comprising a housing including a first portion and a second portion, with the first portion threadably connectable to the second portion, and a gasket provided between the first portion and the second portion, sealing the housing between the first portion and the second portion.

A waterproof ceiling fan assembly comprising a motor assembly suspended from a structure and defining an axis of rotation, a downrod suspending the motor assembly from the structure, a set of blades rotatable by the motor assembly about the axis of rotation, a housing assembly housing the motor assembly, the housing assembly comprising an upper control housing including a first set of control threads and a central opening, a lower control housing including a second set of control threads complementary to the first set of control threads, with the lower control housing including a channel confronting the upper control housing when the upper control housing threadably connects to the lower control housing via the first and second sets of control threads, a rotating motor housing rotatable by the motor assembly and spaced from the lower control housing by a gap, a set of water deflection ribs extending from the lower control housing into the gap, a light housing including a first set of light threads a light glass holder including a second set of light threads complementary to the first set of light threads, with the light glass holder including a holder channel confronting the light housing when the light housing threadably couples to the light glass holder, and the light glass holder including a lip, a light glass supported by the light glass holder and spaced from the lip by a light gap, and a light glass retainer fastened to the light glass holder, sandwiching the light glass between the light glass holder and the light glass retainer, a waterproof assembly comprising a upper control housing gasket provided about the central opening in the upper control housing and confronting the downrod, a lower control housing gasket provided in the channel in the lower control housing, a light housing gasket provided in the holder channel in the light glass holder and compressed between the light glass holder and the light glass, and a downrod gasket provided in the downrod having at least one opening for passing electrical components through the downrod.

The ceiling fan of any of the preceding clauses further comprising a channel formed in one of the first portion or the second portion, with the gasket provided in the channel.

The ceiling fan of any of the preceding clauses wherein the gasket is an O-ring having a diameter that is greater than a depth of the channel.

The ceiling fan of any of the preceding clauses wherein the first portion is an upper control housing and the second portion is a lower control housing.

The ceiling fan of any of the preceding clauses wherein the first portion is a light frame and the second portion is a light glass holder, where the light frame and light glass holder define a light housing.

The ceiling fan of any of the preceding clauses further comprising a light glass secured to the light glass holder.

The ceiling fan of any of the preceding clauses further comprising a second gasket provided between the light glass and the light glass holder.

The ceiling fan of any of the preceding clauses wherein the light glass holder includes a lip and the second gasket is provided in the lip.

The ceiling fan of any of the preceding clauses further comprising a light glass retainer fastened to the light glass holder, with the light glass secured between the light glass holder and the light glass retainer.

The ceiling fan of any of the preceding clauses wherein a fastener fastens the light glass retainer to the light glass holder, and compresses the second gasket between the light glass and the light glass holder.

The ceiling fan of any of the preceding clauses further comprising a downrod, passing through an opening in the housing, and having a first end and a second end, whereby the downrod is configured to suspend the motor assembly from the structure.

The ceiling fan of any of the preceding clauses further comprising a downrod gasket provided between the downrod and the housing at the opening in the housing.

The ceiling fan of any of the preceding clauses wherein the downrod gasket at least partially comprises a wedge shape.

The ceiling fan of any of the preceding clauses wherein the downrod gasket includes a gasket channel configured to receive an edge of the housing along the opening in the housing.

The ceiling fan of any of the preceding clauses further comprising a gasket plug provided in the downrod.

The ceiling fan of any of the preceding clauses wherein the gasket plug includes a plug opening for passing a wire through the gasket plug.

The ceiling fan of any of the preceding clauses further comprising a sealant provided on the gasket plug within the downrod.

The ceiling fan of any of the preceding clauses wherein the housing further includes a rotatable housing portion, coupling the set of blades to the motor assembly.

The ceiling fan of any of the preceding clauses wherein the rotatable housing portion is adjacent to, but spaced from one of the first portion of the second portion by a gap.

The ceiling fan of any of the preceding clauses wherein one of the rotatable housing portion, or the one of the first portion or the second portion adjacent to the rotatable housing portion, includes a first water deflection rib extending into the gap.

The ceiling fan of any of the preceding clauses wherein the first water deflection rib extends from the one of the first portion or the second portion adjacent to the rotatable housing portion.

The ceiling fan of any of the preceding clauses wherein a second water deflection rib extends from the one of the first portion or the second portion adjacent to the rotatable housing portion, and is positioned radially inward of the first water deflection rib, relative to the axis of rotation.

The ceiling fan of any of the preceding clauses further comprising a light kit adapter coupling the motor assembly to a light kit assembly, with the motor assembly or a motor shaft including or coupling to at least one projection extending from the motor assembly or the motor shaft.

The ceiling fan of any of the preceding clauses further comprising a motor adapter gasket positioned between the light kit adapter and one of the first portion or the second portion of the housing.

The ceiling fan of any of the preceding clauses wherein the at least one projection comprises an annular flange.

The ceiling fan of any of the preceding clauses further comprising an electrical connector electrically coupling the motor assembly to an electrical supply for the structure, with the electrical connector sealing electrical leads for the electrical supply.

A ceiling fan comprising a motor assembly suspended from a structure and defining an axis of rotation, a set of blades rotatably driven by the motor assembly, a housing including a rotatable housing portion, coupling the set of blades to the motor assembly, and at least one water deflection device coupled to or contained within the housing.

The ceiling fan of any preceding clause wherein the housing further comprises a first portion or a second portion adjacent to, but spaced from the rotatable housing portion by a gap.

The ceiling fan of any preceding clause wherein the gap further comprises an inlet for a primary water flow that can also serve as an outlet for the primary water flow.

The ceiling fan of any preceding clause wherein one of the rotatable housing portion, or the one of the first portion or the second portion adjacent to the rotatable housing portion, includes a first water deflection rib extending into the gap.

The ceiling fan of any preceding clause wherein the first water deflection rib extends from the one of the first portion or the second portion adjacent to the rotatable housing portion.

The ceiling fan of any preceding clause wherein a second water deflection rib extends from the one of the first portion or the second portion adjacent to the rotatable housing portion, and is positioned radially inward of the first water deflection rib, relative to the axis of rotation.

What is claimed is:

1. A ceiling fan comprising:

a motor assembly suspended from a structure and defining an axis of rotation;

a set of blades rotatably driven by the motor assembly;

a motor housing encasing the motor assembly;

a light kit;

at least one of the motor housing and the light kit has a first portion and a second portion, with both the first portion and second portion extending axially, in a direction of the axis of rotation, for a first length and a second length, respectively, with both the first length and the second length being greater than a respective thickness of the first portion and second portion, and the first portion and second portion defining overlapping first side face and second side face, respectively; and a gasket provided between the overlapping first side face and second side face.

2. The ceiling fan of claim 1, further comprising a channel formed in one of the first side face and second side face, with the gasket provided in the channel.

3. The ceiling fan of claim 2, wherein the gasket is an O-ring having a diameter that is greater than a depth of the channel.

4. The ceiling fan of claim 1, wherein the light kit includes the first portion and the second portion.

5. The ceiling fan of claim 4, wherein the light kit comprises a light glass secured to a light glass holder, and the first portion and second portion are located on a different one of the light glass and light glass holder.

6. The ceiling fan of claim 5, wherein the light glass holder includes a lip and the gasket is provided in the lip.

7. The ceiling fan of claim 6, further comprising a light glass retainer fastened to the light glass holder, with the light glass secured between the light glass holder and the light glass retainer.

8. The ceiling fan of claim 7, wherein a fastener fastens the light glass retainer to the light glass holder.

9. The ceiling fan of claim 1, further comprising a downrod, passing through an opening in the motor housing, and having a first end and a second end, whereby the downrod is configured to suspend the motor assembly from the structure.

10. The ceiling fan of claim 9, further comprising a downrod gasket provided between the downrod and the motor housing at the opening in the motor housing.

11. The ceiling fan of claim 9, further comprising a gasket plug provided in the downrod.

12. The ceiling fan of claim 11, further comprising a sealant provided on the gasket plug within the downrod.

13. The ceiling fan of claim 1, wherein the motor housing comprising an upper control housing, and a lower control housing, and the first portion and second portion are located on a different one of the upper control housing and lower control housing.

14. The ceiling fan of claim 13, wherein the motor housing further comprises a rotatable housing portion.

15. The ceiling fan of claim 14 wherein the rotatable housing portion couples the set of blades to the motor assembly.

16. The ceiling fan of claim 15 wherein the rotatable housing portion is adjacent to and spaced from one of the upper control housing or the lower control housing to define a gap, and one of the rotatable housing portion, the upper control housing, or the lower control housing, includes a first water deflection rib extending into the gap.

17. The ceiling fan of claim 16 wherein a second water deflection rib extends from the one of the upper control housing or the lower control housing adjacent to the rotatable housing portion, and is positioned radially inward of the first water deflection rib, relative to the axis of rotation.

18. The ceiling fan of claim 1, wherein the light kit further comprises a light kit adapter and a light frame, with the light kit adapter coupling the motor assembly to the light frame.

19. The ceiling fan of claim 18 further comprising a motor adapter gasket positioned between the light kit adapter and the light frame.

20. The ceiling fan of claim 19 wherein the light kit adapter includes at least one projection extending from the motor assembly and wherein the at least one projection comprises an annular flange that receives the motor adapter gasket.

21. A ceiling fan comprising:

a motor assembly suspended from a structure and defining an axis of rotation;

a set of blades rotatably driven by the motor assembly;

a motor housing encasing the motor assembly;

a light kit;

at least one of the motor housing and the light kit has a first portion and a second portion, with both the first portion and second portion extending in a direction of the axis of rotation, and both the first portion and second portion have overlapping side faces;

a gasket provided between the overlapping side faces;

a downrod, passing through an opening in the motor housing, and having a first end and a second end, whereby the downrod is configured to suspend the motor assembly from the structure; and a downrod gasket provided between the downrod and the motor housing at the opening in the motor housing.

22. The ceiling fan of claim 21, further comprising a gasket plug provided in the downrod.

23. The ceiling fan of claim 22, further comprising a sealant provided on the gasket plug within the downrod.

24. A ceiling fan comprising:

a motor assembly suspended from a structure and defining an axis of rotation;

a set of blades rotatably driven by the motor assembly;

a motor housing encasing the motor assembly and having an upper control housing, defining a first portion, and a lower control housing, defining a second portion, with both the first portion and second portion extending in a direction of the axis of rotation, and both the first portion and second portion have overlapping side faces; and a gasket provided between the overlapping side faces.

25. The ceiling fan of claim 24, wherein the motor housing further comprises a rotatable housing portion.

26. The ceiling fan of claim 25 wherein the rotatable housing portion couples the set of blades to the motor assembly.

27. The ceiling fan of claim 26 wherein the rotatable housing portion is adjacent to and spaced from one of the upper control housing or the lower control housing to define a gap, and one of the rotatable housing portion, the upper control housing, or the lower control housing, includes a first water deflection rib extending into the gap.

28. The ceiling fan of claim 27 wherein a second water deflection rib extends from the one of the upper control housing or the lower control housing adjacent to the rotatable housing portion, and is positioned radially inward of the first water deflection rib, relative to the axis of rotation.

29. A ceiling fan comprising:

a motor assembly suspended from a structure and defining an axis of rotation;

a set of blades rotatably driven by the motor assembly;

a light kit comprising a light kit adapter and a light frame, with the light kit adapter coupling the motor assembly to the light frame, wherein the light kit adapter, defining a first portion, and the light frame, defining a second portion, with both the first portion and second portion extending in a direction of the axis of rotation, and both the first portion and second portion have overlapping side faces; and a gasket provided between the overlapping side faces.

30. The ceiling fan of claim 24 wherein the light kit adapter includes at least one projection extending from the motor assembly and wherein the at least one projection comprises an annular flange that receives the gasket.

* * * * *